Patented June 13, 1933

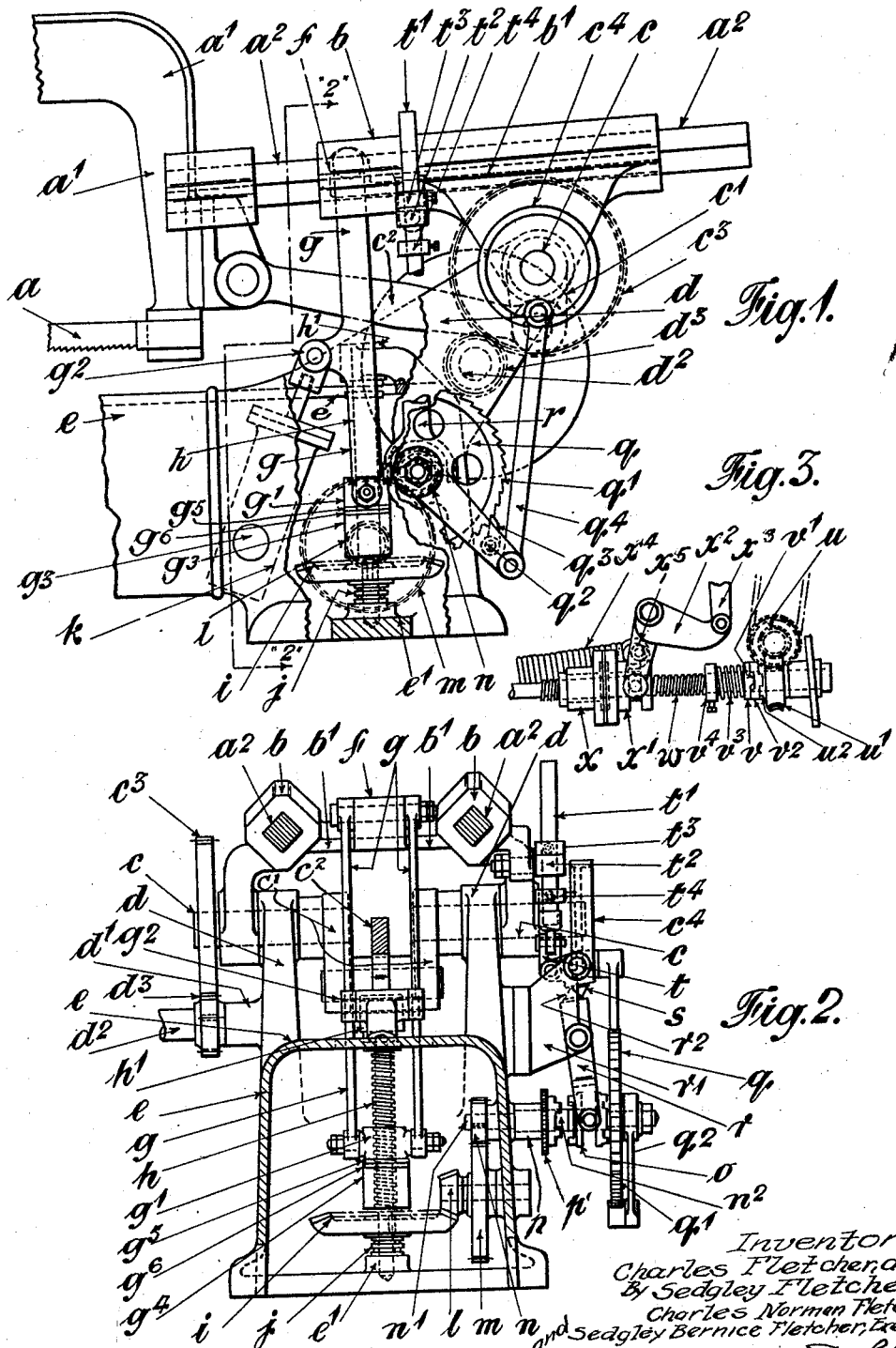

1,913,981

UNITED STATES PATENT OFFICE

CHARLES FLETCHER, DECEASED, LATE OF CHEADLE HULME, ENGLAND, BY SEDGLEY FLETCHER, CHARLES NORMAN FLETCHER, AND SEDGLEY BERNICE FLETCHER, EXECUTORS, ALL OF CHEADLE HULME, ENGLAND

HACK SAW MACHINE

Application filed February 20, 1931, Serial No. 517,274, and in Great Britain February 28, 1930.

This invention refers to hack saw machines of the kind in which the saw is fed to the work by gravity or by spring or other pressure.

When a machine of this type is sawing material of varying section, such as rolled joists or round bars, the weight or spring pressure, if adjusted to give efficient cutting on the widest part of the section, is too great when the machine is sawing the narrowest part, causing an acceleration of the feed and putting too much strain on the saw teeth, which may be damaged or broken in consequence. To avoid this, it is necessary to vary the weight (or pressure) during the cut as the action varies, or to set it so as to be suitable for the narrow section, in which case there is too little pressure on the saw when cutting through the wide section, and it cuts inefficiently.

The object of this invention is to provide simple means for automatically regulating or governing the feed of the saw through the work as the cutting proceeds so that sufficient pressure can be used to give efficient cutting on the widest part of the work while preventing the feed of the saw being accelerated and the teeth of the saw being damaged or broken when cutting through the narrower parts of the work.

According to the invention, the saw is provided with a permissive feed comprising a screw and nut feed mechanism driven from the saw driving mechanism, a friction clutch in the feed mechanism controlling the feed and its parts adapted to be engaged only by reason of the weight or pressure of the saw on the feed mechanism.

Upon the accompanying drawing:

Fig. 1 is a side elevation of one example of a permissive feed made in accordance with the invention.

Fig. 2 is a sectional elevation on line 2—2 of Fig. 1.

Fig. 3 is a side elevation of a modified application of the permissive feed shown in Figs. 1 and 2.

As illustrated, Figs. 1 and 2 show the feed and driving mechanism of a hack saw in which $a$ is the saw blade secured in a frame $a^1$ and supported on a pair of guide rods $a^2$ sliding in sockets $b$ of a bridge piece $b^1$ pivotally mounted on the ends of a crank-shaft $c$ supported in brackets $d$ extending rearwardly from the base $e$ of the machine. The shaft $c$ is provided centrally with a crank $c^1$ which is connected by a link $c^2$ to the saw frame $a^1$. On one of the brackets $d$ is a lug $d^1$ in which is mounted a shaft $d^2$ carrying fast and loose belt pulleys not shown and connected by gear wheels $d^3$ and $c^3$ with the crank-shaft $c$. The bridge piece $b^1$ is formed with a lug $f$ between the front ends of the guide sockets $b$ and this lug is connected by supporting links $g$ to a sleeve $g^1$ slidably arranged on a vertical feed screw $h$. The feed screw $h$ is supported at at its upper end by a lug $h^1$ on the base $e$ and at its lower end is provided with a bevel wheel $i$ and ball thrust race $j$ by which it is supported on a boss $e^1$ in the base $e$ of the machine. On the links $g$ are lugs $g^2$ between which and a pivot $g^3$ on the base of the machine is positioned a dash pot device $k$. On the feed screw $h$ and supporting the sleeve $g^1$ is a screwed nut $g^4$, coacting friction discs $g^5$ and $g^6$ being secured to the adjacent faces of the sleeve and nut. In a lug in the side of the base $e$ is mounted a shaft carrying a bevel wheel $l$ and pinion $m$ keyed together, the bevel wheel $l$ being arranged in mesh with the bevel wheel $i$. Above the pinion $m$ is a further pinion $n$ keyed to a shaft $n^1$ mounted in a lug in the base $e$ and having a splined or squared portion $n^2$ on which is slidably arranged a dog-clutch member $o$. Rotatably mounted on the shaft $n^1$ on either side of the splined portion $n^2$ are driving members $p$ and $q$ respectively, having dog-clutch faces to coact with the sliding clutch member $o$ and provided respectively with chain teeth $p^1$ and with a ratchet wheel $q^1$. On the shaft $n^1$ adjacent to the ratchet wheel $q^1$ is pivoted a ratchet arm $q^2$ with pawl $q^3$ the arm being connected by a link $q^4$ to an eccentric wheel $c^4$ on the end of the crank-shaft $c$.

Automatic change-over mechanism is provided and consists of an operating fork $r$ pivoted in a side-bracket $r^1$ secured to one of the brackets $d$, the upper end of the fork containing a wedge-ended plunger $r^2$ behind which and within the end of the fork is a strong compression spring, not illustrated. Also pivoted in the bracket $r^1$ is a cranked lever having a wedge shaped end $s$ to engage with the plunger $r^2$, the other end of the lever being connected by a link $t$ to a rod $t^1$ the upper end of which passes slidably through an eyebolt $t^2$ in the side of the bridge piece $b^1$. On the rod $t^1$ are adjustable collars $t^3$ and $t^4$ having set-screws for securing them to the rod.

The operation of the feed mechanism is as follows:—

In the example shown in Figs. 1 and 2, the feed screw $h$ is rotated by means of the ratchet mechanism through the ratchet wheel $q$, the clutch $o$ being in engagement therewith and the rotation of the ratchet wheel being transmitted through the pinion wheels $n^1$ and $m$ and the bevel wheels $l$ and $i$. As the saw moves down through the work, under the action of its own weight or a spring, the sleeve $g^1$ with its friction facing $g^5$ rests on the friction facing $g^6$ of the nut $g^4$ and by its frictional engagement therewith holds the nut $g^4$ from turning with the feed screw $h$. Should there be little or no working surface for the saw to cut through the balance of the weight of the saw or of the pull of the spring will be taken by the friction clutch parts $g^5$ and $g^6$ and the nut $g^4$ and feed screw $h$, the action of which will then be as a permissive feed, allowing the saw to descend only at the predetermined rate permitted by the rate of rotation of the feed screw. The automatic return for lifting the saw is obtained by the chain wheel $p$, the changeover of the clutch $o$ being effected as previously described, by means of the rod $t^1$. Automatic knock-off mechanism will also preferably be provided.

If the section of the work remains constant, as in the case of a rectangular bar, and the speed of the screw gives a feed which the saw is capable of maintaining, then the saw feeds at the rate determined by the speed of the screw, but if, for any reason, the saw is not able to cut as quickly as the speed of the screw allows, and is therefore held up on the work, the nut ceases to be held against rotation by the sleeve, and rotates idly with the feed screw until the sleeve again descends and holds the nut against rotation by means of the frictional clutch, when the saw is again lowered at the rate allowed by the screw.

If, by reason of a sudden reduction in the width of the work being cut, the saw is able to cut at a greater speed than the feed screw allows, then the weight of the saw frame is supported on the feed nut, and the feed of the saw is limited to that allowed by the screw. The feed screw, therefore, provides a maximum feed which cannot be exceeded, and allows weight or pressure to be used sufficiently to saw the widest section efficiently without causing the blade to dig in and fracture when the section becomes narrower. Further, it avoids the necessity of suiting the pressure to the narrowest part of the work, or of alteration of pressure during the cut.

If a blade becomes blunted, or if there are hard places in the work being cut, the saw blade is not forced into the work by the screw feed, but is left free to overcome these obstructions, after which the feed is resumed at the predetermined rate.

Prior to starting a cut, the feed screw and nut are used to raise the saw arm to the starting point. By varying its speed, the feed of the screw, or rate of cut, will be varied.

The clutch faces will preferably be produced by means of a layer or layers of any suitable asbestos or like friction lining material.

In the modification shown in Fig. 3 the feed screw $w$ is arranged horizontally and on it is provided the nut $x$ and sleeve $x^1$ which latter in this case is operated by a bell crank lever $x^2$ connected to the saw supporting link $x^3$. Pressure for the saw is obtained by means of a spring $x^4$ connected to a pin $x^5$ on one arm of the lever $x^2$. The feed screw $w$ is driven by a worm $u$ and worm wheel $u^1$, the latter being rotatably mounted on the shaft and having dog-clutch teeth $u^2$. Splined on the shaft is a sliding dog-clutch member $v$ having dog-clutch teeth $v^1$ with inclined sides and between it and the worm wheel $u^1$ is a disc $v^2$ having teeth on each side to coact respectively with the teeth $u^2$ and $v^1$. The dog-clutch member $v$ is pressed against the disc $v^2$ by a spring $v^3$ secured to the shaft $w$ by a collar $v^4$.

In the example shown in Fig. 3, the feed screw $h$ is continuously rotated by the worm $u$ and as the saw descends it moves the sleeve $g^1$ along the screw until it engages the nut $g^4$ when its frictional engagement holds the nut from rotation with the feed screw. In the same manner as in the example shown in Figs. 1 and 2, while the downward speed of the saw is slower than that permitted by the maximum rate of travel of the nut on the screw when held only momentary and light contact between the sleeve $g^1$ and the nut $g^4$ will take place. As soon however as the support of the work lessens too much, or is removed, the weight of the saw is partly or wholly taken by the clutch parts and nut and feed screw which continue to permit a predetermined rate of descent of the saw.

By means of a handle (not shown) on the left hand end of the feed screw $h$ the feed screw may be rotated to raise or lower the saw, the inclined dog clutch teeth $v^1$ riding over its co-acting teeth on the disc $v^2$.

The permissive feed provided by the improved feed mechanism is so termed for the reason that it follows continually with the descent of the saw and permits it to descend at its own rate so long as it is slower than the predetermined maximum allowed by the pitch and gearing of the feed screw.

Each of the feed mechanisms described with reference to and as illustrated in Fig. 3, is also capable of operation for, or of having mechanism to provide, return or lifting of the saw, as it will be seen that while the weight of the saw is effecting the engagement of the clutch parts, the feed may be operated positively in either direction.

The invention is obviously not limited to the examples above described.

What is claimed:—

1. Feed mechanism for hack saw machines comprising a feed screw journaled at its ends in the machine frame, means for rotating the feed screw, a nut freely mounted on the feed screw, and a collar slidably mounted on the feed screw and connected to the saw frame so as to support the same and capable of movement along the screw between the nut and one of the ends of the screw, the collar and nut having complemental friction surfaces.

2. In feed mechanism for hack saw machines according to claim 1, means for lifting the saw but dependent upon the frictional engagement of the saw supporting collar with the nut, comprising reversing gear in the feed screw rotating mechanism.

3. In feed mechanism for hack saw machines according to claim 1, a non-reversible drive for the feed screw and slip clutch mechanism between the drive and the feed screw so that the feed screw may be rotated independently of its driving mechanism for raising or lowering the saw while supported by the feed screw, as set forth.

In testimony whereof we have signed our names to this specification.

C. NORMAN FLETCHER,
SEDGLEY FLETCHER,
SEDGLEY BERNICE FLETCHER,
*Executors of the Estate of Charles Fletcher, Deceased.*